US010644612B2

(12) United States Patent
Soto et al.

(10) Patent No.: US 10,644,612 B2
(45) Date of Patent: May 5, 2020

(54) SYSTEM OF INPUT CURRENT SHARING FOR COMPACT ARCHITECTURE IN A POWER CONVERTER

(71) Applicant: General Electric Company, Schenectady, NY (US)

(72) Inventors: Guillermo Garcia Soto, Buc (FR); Christophe Robert, Yvelines (FR); Philippe Ernest, Buc (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/827,981

(22) Filed: Nov. 30, 2017

(65) Prior Publication Data

US 2019/0165689 A1 May 30, 2019

(51) Int. Cl.
*H02M 7/49* (2007.01)
*H02M 7/493* (2007.01)
*H02M 7/23* (2006.01)
*H02M 7/48* (2007.01)
*H02M 3/158* (2006.01)

(52) U.S. Cl.
CPC ............ *H02M 7/493* (2013.01); *H02M 7/23* (2013.01); *H02M 3/1584* (2013.01); *H02M 2007/4822* (2013.01)

(58) Field of Classification Search
CPC . H02M 7/23; H02M 7/493; H02M 2007/4822
See application file for complete search history.

(56) References Cited

U.S. PATENT DOCUMENTS

| 7,564,703 B1 * | 7/2009 | Braun | H02M 7/493 |
| | | | 363/34 |
| 2006/0227483 A1 * | 10/2006 | Akagi | H02M 1/12 |
| | | | 361/118 |

(Continued)

FOREIGN PATENT DOCUMENTS

TW 201143262 A 12/2011

OTHER PUBLICATIONS

English Translation of Abstract for TW201143262; obtained from website worldwide.espacenet.com; Aug. 2, 2019; 1 page.

(Continued)

*Primary Examiner* — Fred E Finch, III
*Assistant Examiner* — Rafael O. De León Domenech
(74) *Attorney, Agent, or Firm* — Boyle Fredrickson, S.C.

(57) ABSTRACT

A power converter with a modular, compact architecture with a reduced component count is disclosed. The power converter includes parallel power conversion sections and utilizes one or more mutual coupling input inductors with multiple windings. The windings are connected in pairs in a differential mode between a power source and the parallel power conversion sections. Each power conversion section receives the same input voltage and generates the same output voltage. As a result of the winding connections and the same input and output voltages, the input of the power converter exhibits current balancing and sharing between each branch of the parallel configuration, allowing a single current sensor to provide a measurement of the current and a single controller to control operation of each of the power conversion sections.

3 Claims, 8 Drawing Sheets

(56) References Cited

U.S. PATENT DOCUMENTS

2014/0133201 A1* 5/2014 Brandmeyer ........... H02J 9/061
                                                      363/65
2017/0294833 A1* 10/2017 Yang .................. H01F 27/2804
2018/0091062 A1* 3/2018 Hsieh .................. H02M 5/4585
2019/0348918 A1* 11/2019 Ojika .................. H02M 3/1584

OTHER PUBLICATIONS

European Search Report; dated Apr. 8, 2019; 21 pages.
Kaspars Kroics et al: "Design of coupled inductor for interleaved boost converter", NR, Dec. 31, 2014 (Dec. 31, 2014), XP055573123, DOI: 10.12915/pe.2014.12.21 Retrieved from the Internet: URL:https//pdfs.semanticscholar.org/66dd/687a1d73e6271edbed8502e1280df104b47.pdf [retrieved on Mar. 22, 2019] p. 91; figure 2.
Kaspars Kroics et al: "Multiphase interleaved DC-DC converter with directly and inversely coupled inductors", 2016 57th International Scientific Conference on Power and Electrical Engineering of RIGA Technical University (RTUCON), Oct. 31, 2016 (Oct. 31, 2016), pp. 1-6, XP055573219, DOI: 10.1109/RTUCON.2016.7763102 ISBN: 978-1-5090-3731-5 pp. 1,2; figures 2, 3.

* cited by examiner

SYSTEM OF INPUT CURRENT SHARING FOR COMPACT ARCHITECTURE IN A POWER CONVERTER

BACKGROUND OF THE INVENTION

The subject matter disclosed herein relates to a power converter with a modular, compact architecture with a reduced component count. More specifically, the power converter includes parallel power conversion sections and utilizes one or more mutual coupling input inductors with multiple windings connected in pairs in a differential mode between a power source and the parallel power conversion sections resulting in current balancing and sharing between each branch of the parallel configuration.

As is known to those skilled in the art power converters allow for a controlled output voltage and/or current to be supplied from an input power source. The input power source may be an Alternating Current (AC) or a Direct Current (DC) voltage having a first amplitude and frequency. The output of the power converter may be either an AC or a DC voltage having a second amplitude and frequency, where the second amplitude and/or frequency is different than the first amplitude and/or frequency. The output of the power converter may be either fixed or variable according to the configuration of the power converter. Numerous configurations of one or more active or passive switching devices along with inductive or capacitive devices are arranged to provide the controlled output voltage.

In order to convert the voltage from the first amplitude and frequency at the input to the second amplitude and frequency at the output, the power converter utilizes one or more power switching devices, such as thyristors, silicon controlled rectifiers (SCRs), diodes, metal-oxide-semiconductor field-effect transistors (MOSFETs), insulated-gate bipolar transistor (IGBTs), other power transistors, and the like. The power switching devices may be active or passive and a controller may generate switching signals to control operation of the active devices. The switching devices turn on and off at frequencies ranging from hundreds of hertz to hundreds of kilohertz in order to synthesize the desired output voltage from the input voltage.

Switching the devices on and off, however, creates an electrically noisy environment with undesirable conducted and/or radiated emissions. The undesirable conducted emissions include transient voltages and/or currents at the input and output of the power converter. In order to limit the undesirable conducted emissions, filtering devices may be connected at the input or output. As the power rating of a power converter increases, the switching devices as well as the filtering devices must be sized accordingly. Increasing the power rating of the switching devices and/or the filtering devices typically results in an increase in cost, due for example to more expensive materials; an increase in size to handle the increased current capacity-, or a combination thereof.

At high power levels, the devices can either no longer be rated to handle the desired power or the cost of devices that can be rated to handle the desired power is too great. Historically, these drawbacks have been overcome by providing multiple power conversion sections operating in parallel. Each power conversion section handles a portion of the power for the system and, therefore, the components for each section need only be rated to handle the corresponding portion of the power.

However, such systems are not without drawbacks. Each power conversion section requires its own filters and switching devices. As a result, the physical size of the system increases.

It is a first feature of the invention to provide a paralleled power converter system with a reduced size.

It is another feature of the invention to provide a paralleled power converter system with a reduced component count, which, in turn, reduces cost and further reduces size.

It has also been known to provide separate controllers to control each power conversion section. The controllers of each power conversion section must be synchronized to operate together and to produce the desired output voltage. Synchronization requires communication between the controllers. As previously indicated, the rapid switching of the switching devices creates an electrically noisy environment. The electrical noise may cause errors in the communication between controllers or require additional shielding to prevent the errors from occurring.

It is still another feature of the invention to provide a paralleled power converter system which does not require communications between power conversion sections.

BRIEF DESCRIPTION OF THE INVENTION

The subject matter disclosed herein describes a power converter with a modular, compact architecture with a reduced component count and reduced size. The power converter includes parallel power conversion sections and utilizes one or more mutual coupling input inductors with multiple windings. The mutual windings are connected in pairs in a differential mode between a power source and the parallel power conversion sections. Each power conversion section receives the same input voltage and generates the same output voltage. As a result of the winding connections and the same input and output voltages, the input of the power converter exhibits current balancing and sharing between each section of the parallel configuration, allowing a single current sensor to provide a measurement of the current. The current measurement is provided to a single controller, which generates control signals for each of the power conversion sections. The single controller eliminates the requirement for communication between power conversion.

According to one embodiment of the invention, a power converter includes multiple power conversion sections, a mutual choke, a current sensor, and a controller. Each power conversion section includes an input and an output. The input is operative to receive a first voltage having a first magnitude and a first frequency, and the output is operative to deliver a second voltage having a second magnitude and a second frequency. The mutual choke includes a magnetic core, a first winding, and a second winding. The first winding on the magnetic core is connected in series between a power source and a first power conversion section, selected from the plurality of power conversion sections. The second winding on the magnetic core is connected in series between the power source and a second power conversion section, selected from the plurality of power conversion sections. The first winding is operative to conduct a first current, and the second winding operative to conduct a second current. The first and second windings are connected between the power source and the first and second power conversion sections, respectively, such that the first current flows in an opposite direction than the second current with respect to the magnetic core. The current sensor is operative to generate a signal corresponding to an amplitude of current entering the power conversion section. The controller is operative to receive the signal from the current sensor and to generate a first set of control signals for the first power conversion section and a second set of control signals for the second power conversion section responsive to the signal from the current sensor.

According to another embodiment of the invention, a modular power converter includes at least one pair of power conversion sections, a mutual choke, a current sensor, and a controller. Each pair of power conversion sections includes a first power conversion section and a second power conversion section. The first power conversion section includes an input operative to receive a first voltage having a first magnitude and a first frequency and an output operative to deliver a second voltage having a second magnitude and a second frequency. The second power conversion section includes an input operative to receive the first voltage and an output operative to deliver the second voltage. The mutual choke includes a first winding electrically connected between a power source and the first power conversion section and a second winding electrically connected between the power source and the second power conversion section. The first and second windings are electrically connected such that a first current in the first winding flows in an opposite direction than a second current in the second winding. The current sensor is operative to generate a signal corresponding to an amplitude of current provided to the first power conversion section, the second power conversion section or a combination thereof. The controller is operative to receive the signal from the current sensor and to generate a first set of control signals for the first power conversion section and a second set of control signals for the second power conversion section responsive to the signal from the current sensor.

According to still another embodiment of the invention, a modular power converter includes at least one pair of power conversion sections, at least one choke, a current sensor, and a controller. Each pair of power conversion sections is operative to receive a first voltage having a first magnitude and a first frequency and an output operative to deliver a second voltage having a second magnitude and a second frequency. Each choke includes at least one pair of windings connected in a differential mode, and each pair of windings is configured to be connected between a power source operative to provide the first voltage and one pair of the power conversion sections. The current sensor is operative to generate a signal corresponding to an amplitude of current provided to the modular power converter, and the controller is operative to receive the signal from the current sensor and to generate a set of control signals for each pair of power conversion sections responsive to the signal from the current sensor.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

Figure 1:
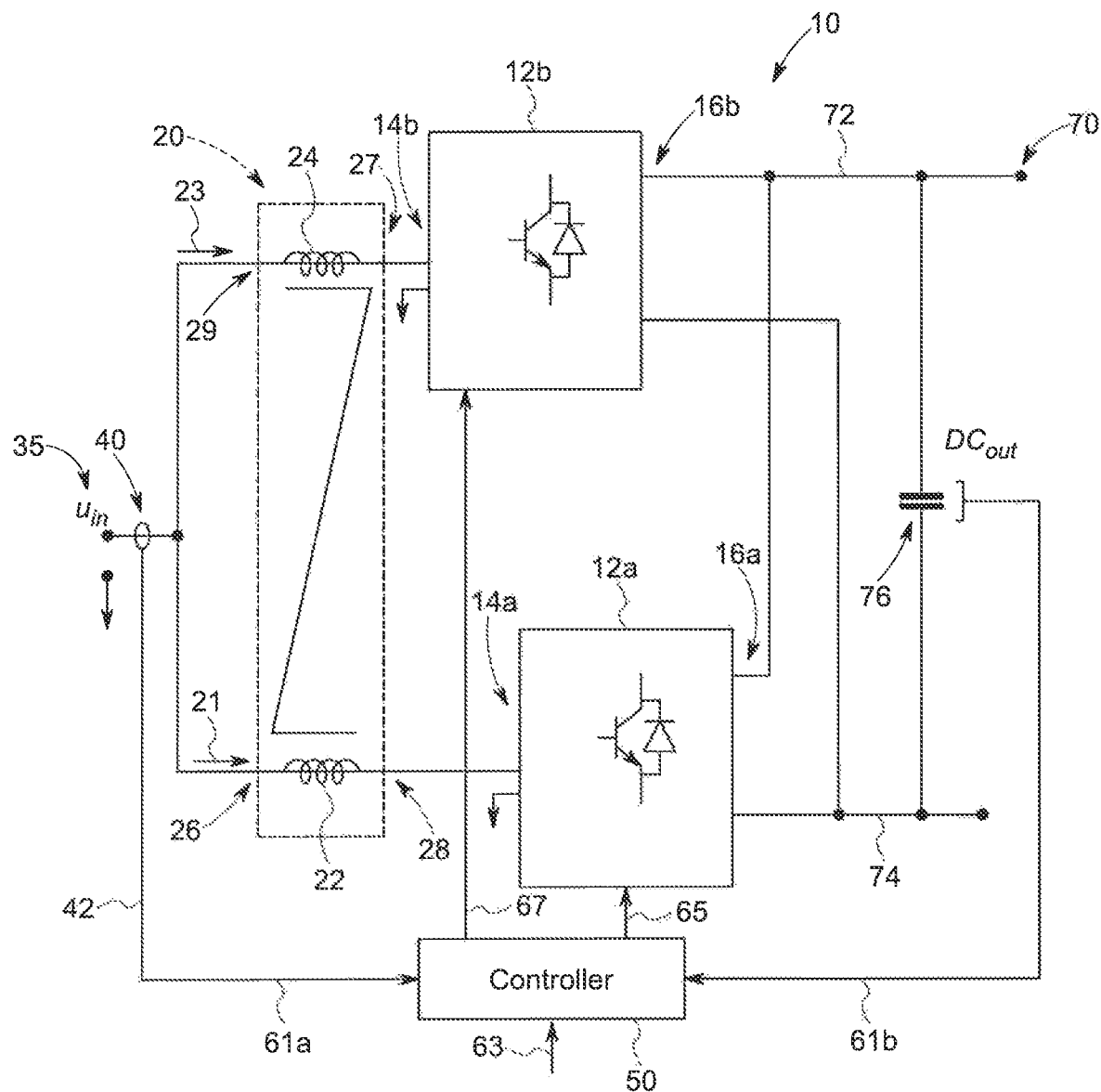
FIG. 1 is a schematic representation of an exemplary power converter incorporating a mutual coupling input inductor for one pair of branches in the power converter according to one embodiment of the invention.
Figure 7:
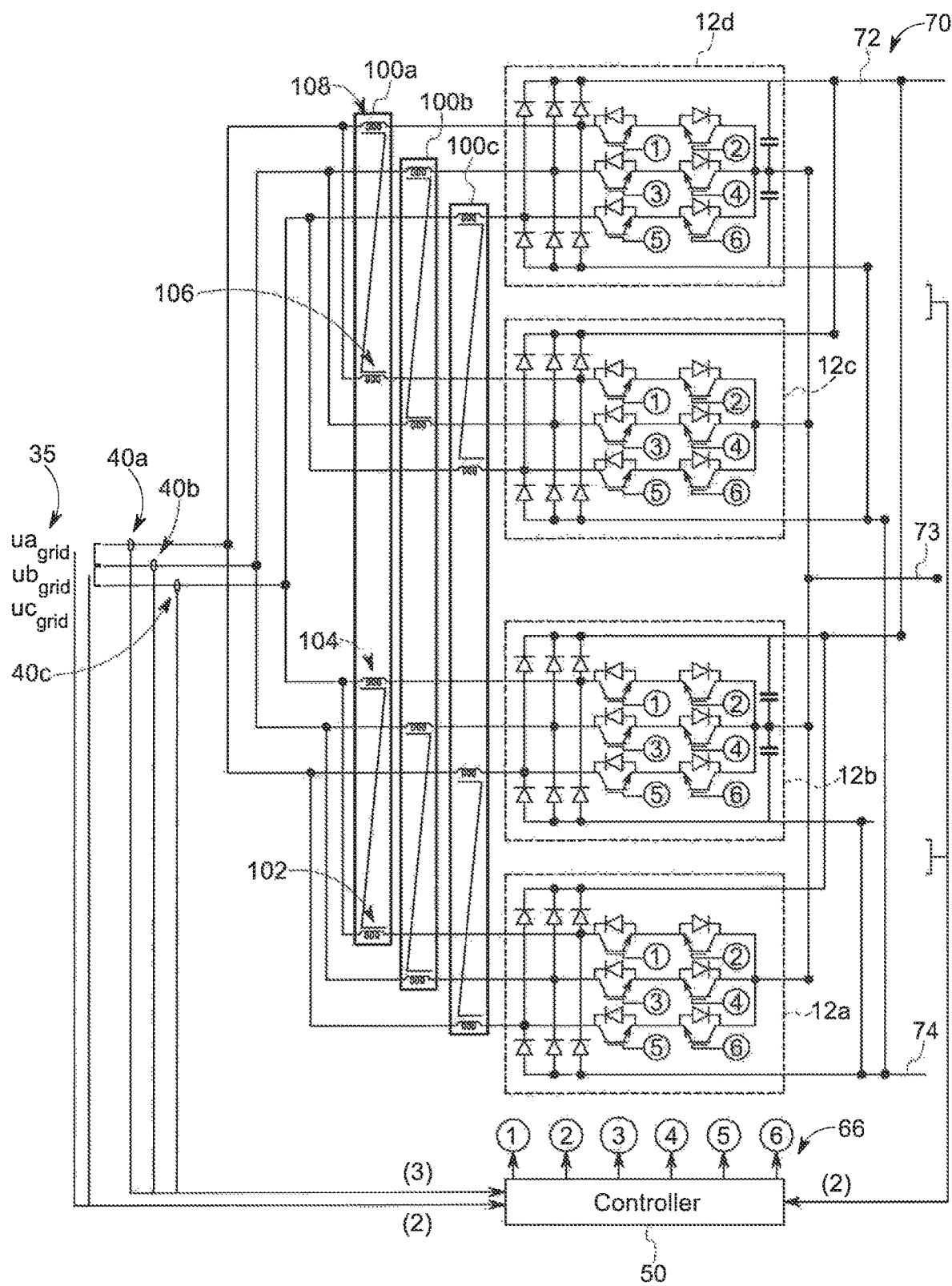
Figure 8:
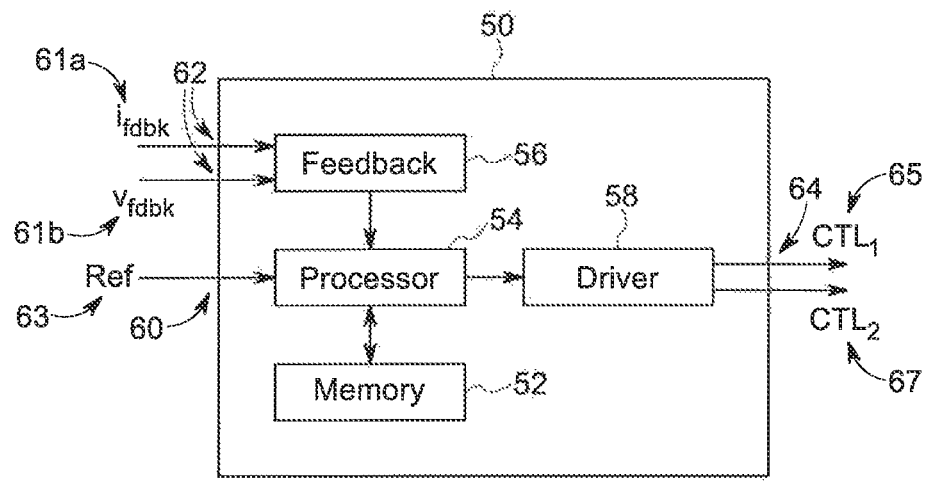
Figure 9:
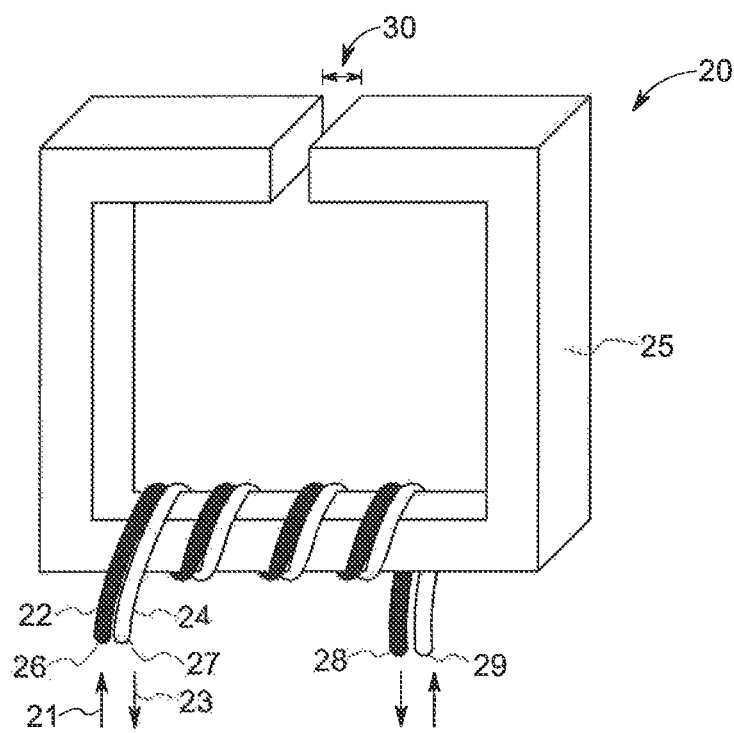

FIG. 7 is a schematic representation of an exemplary power converter with a multi-phase AC power source incorporating multiple, mutual coupling input inductors with four branches, where each inductor corresponds to one phase of the AC power source according to another embodiment of the invention; and FIG. 8 is a block diagram representation of one embodiment of the controller of FIG. 1; and FIG. 9 is a representative illustration of a choke with multiple windings wound around a common core.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE INVENTION

The various features and advantageous details of the subject matter disclosed herein are explained more fully with reference to the non-limiting embodiments described in detail in the following description.

Turning initially to FIG. 1, a power converter 10 according to one embodiment of the invention is illustrated. The power converter 10 includes a first power conversion section 12a and a second power conversion section 12b. Each of the first and second power conversion sections are connected in parallel between a power source 35 and an output 70. According to the illustrated embodiment, the power source 35 is a direct current (DC) power source, supplying a first DC voltage, $u_{in}$. The output 70 of the power converter 10 is a DC bus having a positive rail 72 and a negative rail 74 across which a second DC voltage, $DC_{out}$, is provided. The first voltage, $u_{in}$, provided as an input to the power converter 10 has a first amplitude and a first frequency, where the frequency is zero hertz (0 Hz) for a DC voltage. The second voltage, $DC_{out}$, provided as an output from the power converter 10 has a second amplitude and a second frequency, where the frequency is zero hertz (0 Hz) for a DC voltage. It is contemplated the power converter 10 may be: a boost converter, such that the second voltage is greater than the first voltage, a buck converter, such that the second voltage is less than the first voltage, or a combination thereof where the output voltage may vary according to application requirements and may be either greater than or less than the input voltage.

The power converter 10 further includes a mutual choke 20 connected in series between the DC power source 35 and each of the power conversion sections. The mutual choke 20 is a single magnetic device which includes a separate winding for each power conversion section wound on the single magnetic device. According to the illustrated embodiment, a first winding 22 is connected in series between the power source 35 and the first power conversion section 12a, and a second winding 24 is connected in series between the power source 35 and the second power conversion section 12b. With reference also to FIG. 9, an exemplary mutual choke 20 is illustrated. The exemplary mutual choke 20 is shown with only four turns in each winding for ease of illustration and is not intended to be limiting. Similarly, a square magnetic core 25 is illustrated for ease of illustration and is not intended to be limiting. The shape of the magnetic core 25 or the number of turns for each winding will be selected according to the application requirements to achieve a desired inductance in each of the windings 22, 24.

Each of the first and second windings 22, 24 are wound on the magnetic core 25 and connected between the power source 35 and the power conversion sections 12a, 12b in a differential mode. In other words, the current flows through each winding in opposite directions with respect to the magnetic core 25. The first winding 22 includes a first end 26 and a second end 28, and the second winding 24 includes a first end 29 and a second end 27. Both the first winding 22 and the second winding 24 are connected between the power source 35 and the respective power conversion section 12a, 12b such that current flows from the power source 35 to the corresponding power conversion section 12a, 12b. However, the first end 26 of the first winding 22 begins at the second end 27 of the second winding 24 and the two windings are wound about the core 25 of the mutual choke 20 such that the second end 28 of the first winding 22 is at the first end 29 of the second winding 24. A first current 21 flowing through the first winding 22 is conducted through the first winding 22 in a first direction. A second current 23 flowing through the second winding 24 is conducted through the second winding 24 in a second direction. The first direction is opposite the second direction with respect to the magnetic core 25 of the choke 20. Although each winding is illustrated as terminating proximate the core 25, this is for ease of illustration and for providing reference numerals in other figures. It is contemplated, for example, that a single conductor may span between the power source 35 and one of the power conversion sections, where a portion of the single conductor is wound around the magnetic core, defining the winding.

Figure 2:
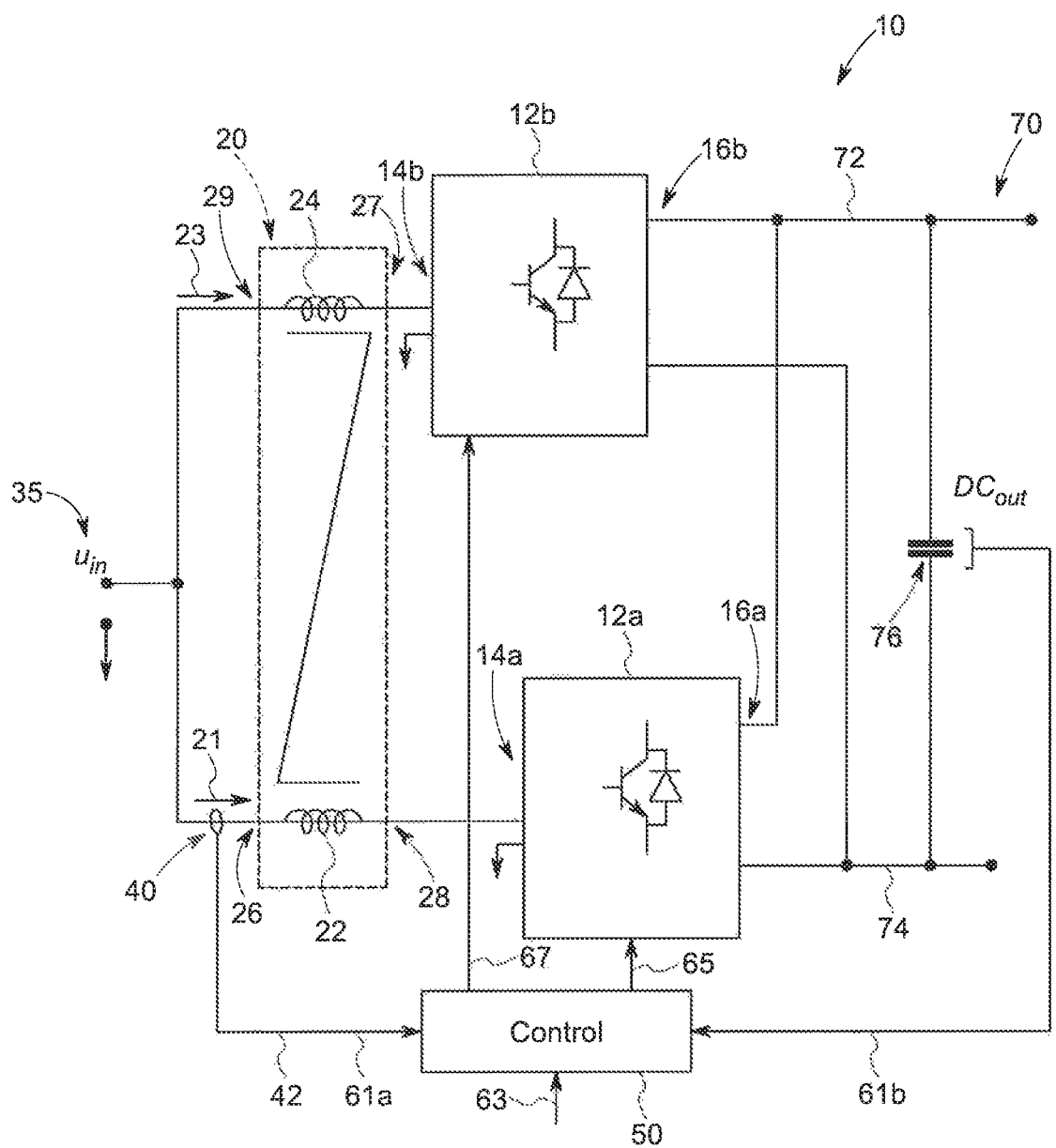
FIG. 2 is a schematic representation of an exemplary power converter incorporating a mutual coupling input inductor for one pair of branches in the power converter according to another embodiment of the invention.

The power converter 10 also includes a current sensor 40 generating a signal 42 corresponding to an amplitude of current at the input of the power converter 10. With reference to FIGS. 1 and 2, a single current sensor 40 is provided at some location on the input side of the power converter 10. The illustrated power converter includes two branches, where a first branch is defined, at least in part, by the first winding 22 and the first power conversion section 12a and a second branch is defined, at least in part, by the second winding 24 and the second power conversion section 12b. A common, or shared, electrical conductor is connected between the power source 35 and the two branches. In FIG. 1, the current sensor 40 is illustrated as being operatively connected to the common electrical conductor. In FIG. 2, the current sensor 40 is illustrated as being operatively connected in the first branch. In either location, the signal 42 generated by the current sensor 40 is provided to a controller 50 for the power converter 10.

The controller 50 is operative to control operation of each of the power conversion sections 12 in the power converter 10. With reference also to FIG. 8, the controller 50 includes a non-transitive memory 52 operative to store a series of instructions for execution on a processor 54. It is contemplated that the processor 54 may be a single processor or multiple processors executing in parallel or asynchronously. The controller 50 also includes a feedback circuit 56 configured to receive current feedback signals, $i_{fdbk}$, 61a and voltage feedback signals, $v_{fdbk}$, 61b and to provide the feedback signals 61 to the processor 54. The processor 54 is operative to execute the stored instructions to generate control signals, CTL1 and CTL2, for each power conversion section 12. The control signals are transmitted via a driver circuit 58 from an output 64 of the controller 50 to each power conversion section 12.

Figure 3:
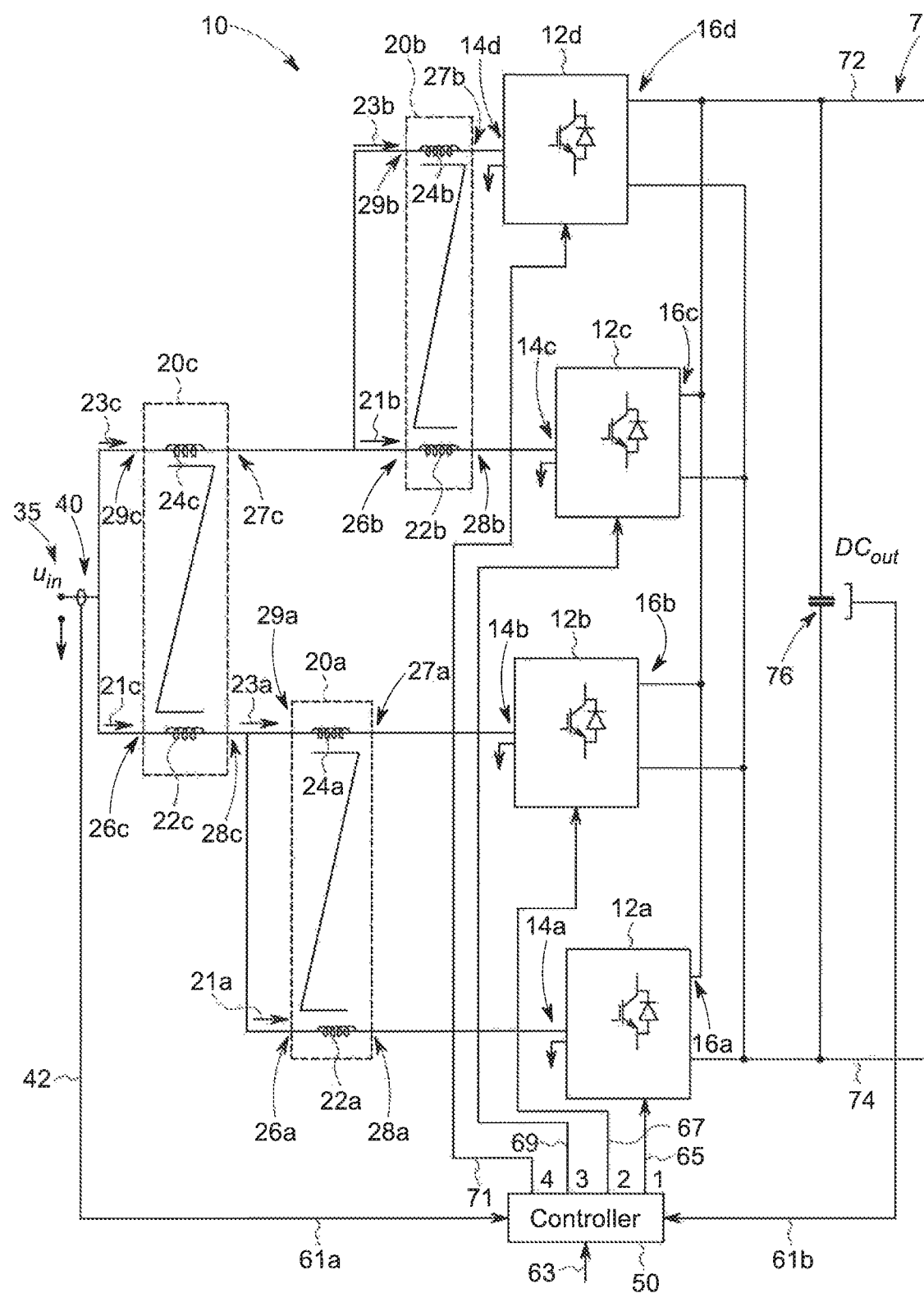
FIG. 3 is a schematic representation of an exemplary power converter incorporating modular, mutual coupling input inductors for current sharing between two pairs of branches of the power converter according to another embodiment of the invention.
Figure 4:
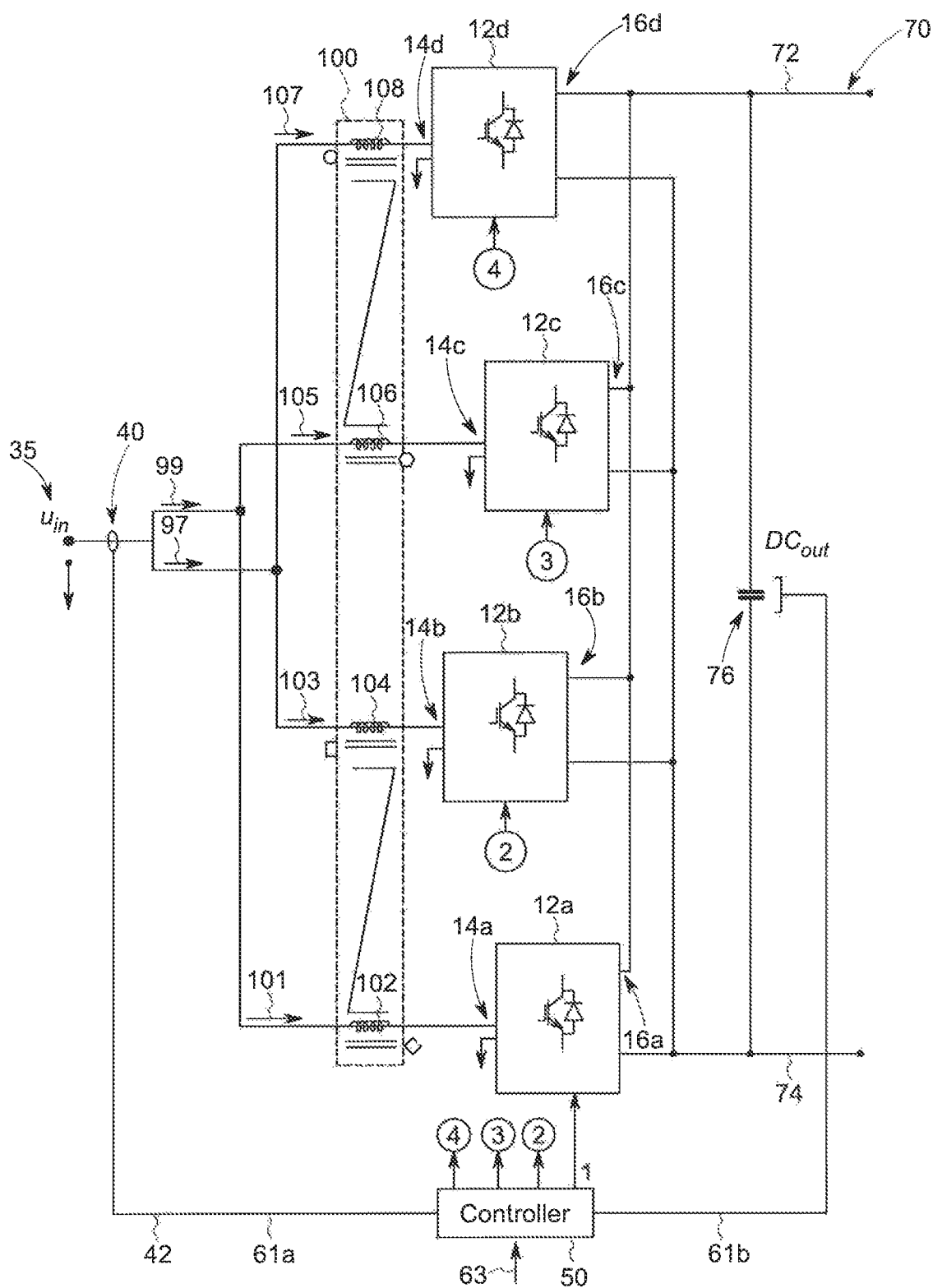
FIG. 4 is a schematic representation of an exemplary power converter incorporating a mutual coupling input inductor with two pairs of branches, in the power converter according to another embodiment of the invention.

The embodiment of the power converter 10 illustrated in FIGS. 1 and 2 includes a single pair of power conversion sections 12 and a single mutual choke 20. The pair of power conversion sections 12 and chokes may be replicated in a modular manner to increase the capacity of the power converter 10. Turning next to FIGS. 3 and 4, additional embodiments of the power converter 10 with multiple pairs of power conversion sections 12 and multiple chokes 20 are illustrated.

With reference first to FIG. 3, the power converter 10 includes four power conversion sections 12. The power conversion sections 12 are provided in pairs. Although illustrated with two pairs, it is contemplated that the power conversion sections 12 may be provided in various other numbers of paired sections according to the application requirements. A first power conversion section 12a and a second power conversion section 12b define a first pair of power conversion sections, and a third power conversion section 12c and a fourth power conversion section 12d define a second pair of power conversion sections. A first choke 20a includes a pair of windings 22a, 24a connected in a differential mode to the first pair of power conversion sections 12a, 12b. A second choke 20b includes a second pair of windings 22b, 24b connected in a differential mode to the second pair of power conversion sections 12c, 12d. A third choke 20c is also provided between the power source 35 and each of the first and second chokes 20a, 20b. The third choke 20c includes a third pair of windings 22c, 24c where the third pair of windings are connected in a differential mode to the first and second chokes. Thus, the third choke 20c first splits the current from the power source 35 into a first current 21c and a second current 23c through the third choke 20c. Each of the first and second currents 21c, 23c in the third choke 20c are again split into two additional branches at the first and second chokes 20a, 20b.

The controller 50 receives a single current feedback signal 61a from the current sensor 40 at the input to the power converter 10 and generates four sets of control signals 65, 67, 69, 71. The first set of control signals 65 is sent from the controller 50 to the first power conversion section 12a. The second set of control signals 67 is sent from the controller 50 to the second power conversion section 12b. The third set of control signals 69 is sent from the controller 50 to the third power conversion section 12c. The fourth set of control signals 71 is sent from the controller 50 to the fourth power conversion section 12d. The output of each power conversion section is connected in parallel and provided to the DC bus 70 at the output of the power converter 10.

Referring next to FIG. 4, another embodiment of the invention including four power conversion sections 12 is illustrated. The power conversion sections 12 are again provided in pairs. A first power conversion section 12a and a second power conversion section 12b define a first pair of power conversion sections, and a third power conversion section 12c and a fourth power conversion section 12d define a second pair of power conversion sections. A mutual choke 100 is provided with windings for all four power conversion sections 12 wound around a shared magnetic core. A first winding 102 and a second winding 104 are connected in a differential mode to the first pair of power conversion sections 12a, 12b. A third winding 106 and a fourth winding 108 are connected in a differential mode to the second pair of power conversion sections 12c, 12d. As illustrated, the current from the power source 35 is first divided into a first current 97 and a second current 99 which is each provided to a pair of windings. The first current 97 is divided into two additional currents 101, 105 which are each conducted through one of the windings 102, 106 on the choke 100, and the second current 99 is divided into two additional currents 103, 107 which are each conducted through one of the windings 104, 108 on the choke 100. Optionally, it is contemplated that the windings may be connected directly to the power source 35 at a single connection point. The output of each power conversion section 12 is connected in parallel and provided to the DC bus 70 at the output of the power converter 10.

Figure 5:
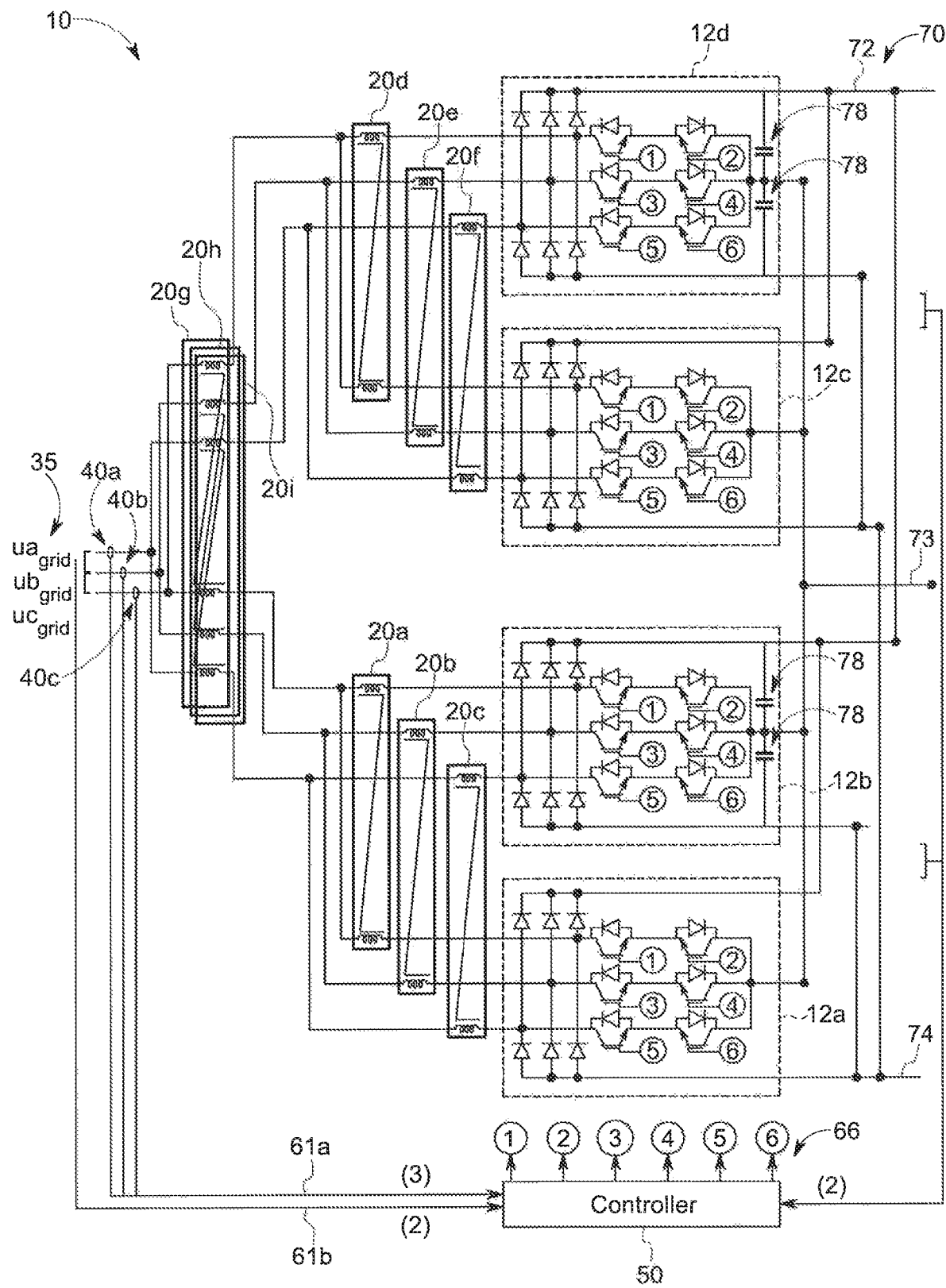
FIG. 5 is a schematic representation of an exemplary power converter incorporating modular, mutual coupling input inductors with a multi-phase alternating current (AC) power source for current sharing between four branches of the power converter according to another embodiment of the invention.

Turning next to FIG. 5, an exemplary power converter 10 configured to receive an alternating current (AC) voltage from the power source 35 is illustrated. The illustrated power source includes four separate, or two pairs of, power conversion sections 12. Similar, to the power converters 10 illustrated, for example, in FIGS. 1 and 2 for a DC power source, it is contemplated that the power converter 10 may include a single pair of power conversion sections 12. Optionally, more than two pairs of power conversion sections may be provided according to the application requirements. A first power conversion section 12a and a second power conversion section 12b define a first pair of power conversion sections, and a third power conversion section 12c and a fourth power conversion section 12d define a second pair of power conversion sections.

According to the illustrated embodiment, the AC power source 35 provides a three-phase voltage from a utility grid. A separate choke 20 is provided for each phase of the voltage. A single-phase AC voltage, therefore, utilizes a single choke and a multi-phase voltage having other numbers of phases utilizes a single choke 20 for each phase. As illustrated, a first set of three chokes is provided between the three-phase voltage and the first pair of power conversion sections. A first choke 20a, which includes a pair of windings, is connected in a differential mode in the first phase of the three-phase voltage supplied to the first pair of power conversion sections 12a, 12b. A second choke 20b, which includes a pair of windings, is connected in a differential mode in the second phase of the three-phase voltage supplied to the first pair of power conversion sections 12a, 12b. A third choke 20c, which includes a pair of windings, is connected in a differential mode in the third phase of the three-phase voltage supplied to the first pair of power conversion sections 12a, 12b. Similarly, a second set of three chokes is provided between the three-phase voltage and the second pair of power conversion sections. Three chokes 20d, 20e, 20f, each of which includes a pair of windings, are connected in each of the three phases supplied to the second pair of power conversion sections 12c, 12d. A third set of chokes is provided between the power source 35 and each of the first and second set of chokes. Each of the three chokes 20g, 20h, 20i in the third set includes a pair of windings and is connected in a differential mode in one of the three phases of the three-phase voltage between the power source 35 and each of the first and second set of chokes.

Figure 6:
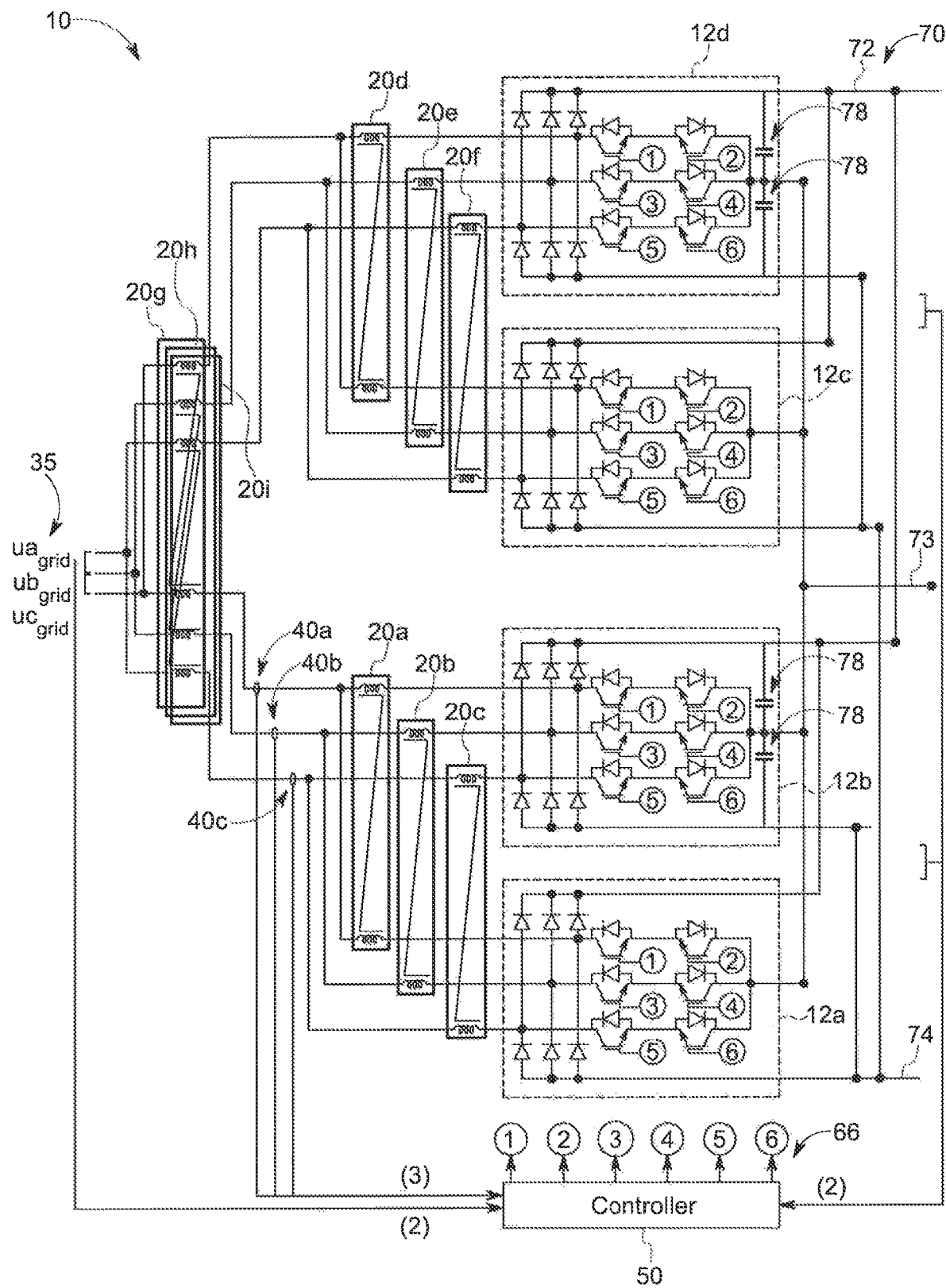
FIG. 6 is a schematic representation of an exemplary power converter incorporating modular, mutual coupling input inductors with a multi-phase alternating current (AC) power source for current sharing between four branches of the power converter according to another embodiment of the invention.

The controller 50 receives current feedback signals 61 from a current sensor 40 present on each phase of the input. As illustrated, a first current sensor 40a is located on a first phase, a second current sensor 40b is located on a second phase, and a third current sensor 40c is located on a third phase. Each of the current sensors 40a, 40b, 40c generate a signal corresponding to an amplitude of current present in the phase and the signal is provided as an input to the controller 50. The controller generates a set of control signals 66 used to control operation of each power conversion section 12 as a function of the current feedback signals. As illustrated in FIG. 5, the current sensors 40 may be located prior to any branches in the power converter 10 and provide a signal corresponding to a total current input to the power converter 10. As illustrated in FIG. 6, it is also contemplated that the current sensors 40 may be located in one of the branches, either at an intermediate location as shown, or in a final branch connected to one of the power conversion sections 12. The signals generated by the current sensors 40 will then correspond to an amplitude of current at the location along the branch at which the current sensor is mounted.

Referring next to FIG. 7, another embodiment of the invention including four power conversion sections 12 for an AC power source 35 is illustrated. The power conversion sections 12 are again provided in pairs. A first power conversion section 12a and a second power conversion section 12b define a first pair of power conversion sections, and a third power conversion section 12c and a fourth power conversion section 12d define a second pair of power conversion sections. A set of mutual chokes 100 is provided for each phase of the AC power source. A first choke 100a is provided for the first phase and includes four windings. A first winding 102 and a second winding 104 are connected as a first pair in a differential connection between the power source 35 and the first phase input for a first power conversion section 12a and the first phase input for a second power conversion section 12b. A third winding 106 and a fourth winding 108 are connected as a second pair in a differential connection between the power source 35 and the first phase input for a third power conversion section 12c and the first phase input for a fourth power conversion section 12d. A second choke 100b and a third choke 100c are also provided for the second and third phases, respectively. Each of the second and third chokes 100b, 100c also include four windings. The four windings are connected in differential pairs to connect the respective phases of the power source 35 to the corresponding phase inputs in each of the power conversion sections 12.

The output of each of the power converters illustrated in FIGS. 5-7 is provided at a DC bus 70. The illustrated DC bus 70 includes multiple DC voltages. Each power conversion section 12 includes a set of diodes to rectify the AC voltage. The rectified AC voltage is output as a DC voltage substantially equal to the peak-to-peak value of the AC input voltage between a positive rail 72 and a negative rail 74 of the DC bus. A set of transistors connected in pairs on each phase of the input voltage to provide a third voltage at an intermediate rail 73 of the DC bus.

In operation, the power converter 10 is operative to convert a first voltage having a first magnitude and a first frequency to a second voltage having a second magnitude and a second frequency. As illustrated in FIGS. 1-4, the power converter 10 converts a first DC voltage received at an input of the power converter 10 to a second DC voltage present at the output 70 of the power converter. As illustrated in FIGS. 5-7, the power converter 10 converts an AC voltage received at the input of the power converter 10 to a DC voltage present at the output 70 of the power converter. The illustrated embodiments demonstrate a DC-to-DC power conversion and an AC-to-DC power conversion. It is further contemplated that the modular architecture described herein may be similarly applied to a DC-to-AC power conversion or to an AC-to-AC power conversion without deviating from the scope of the invention.

The power converter 10 utilizes pairs of power conversion sections, coupled with a shared magnetic device, such as a choke, 20 at the input of the two power conversion sections to achieve a reduced size from a standard power converter. The construction of the power conversion section 12 and each winding 22, 24 on the choke 20 is the same such that the electrical properties of each branch in the power converter 10 is the same. A branch of the power converter 10, as used herein, includes one power conversion section 12 and one of the windings 22, 24 in a pair of windings on the choke 20 for a DC input. The branch includes one power conversion section 12 and one of the windings 22, 24 in each pair of windings of the choke 20 for each phase of an AC input. The configuration of the shared magnetic device and paired power conversions sections results in a natural current balancing between branches of the power converter 10. As a result, the current flowing in each branch of the power converter 10 is substantially the same although it is understood that minor variations in the amplitude of the current will exist due, for example, to manufacturing and component tolerances.

As discussed above, the pairs of windings 22, 24 on each core 25 are connected in a differential manner between the input and the output of the choke 20. The differential connection of the windings 22, 24 is used to cancel at least a portion of the flux generated in the core 25 of the magnetic device 20. The current flowing through each winding 22, 24 on the choke 20 generates magnetic flux that is conducted within the core 25. The flux generated includes both a continuous component and an alternating component, and the magnitude of flux generated is proportional to the amplitude of current flowing in each winding 22, 24. Because the amount of current is balanced between branches, the magnitude of flux generated in the core from each winding 22, 24 has the same magnitude. However, because the current is flowing through each winding in opposite directions around the core 25 (see e.g., FIG. 9), the polarity of the flux generated by the first winding 22 is opposite and the polarity of the flux generated by the second winding 24. Thus, the continuous component of the flux generated in the core 25 by the first winding 22 cancels the continuous component of the flux generated in the core 25 by the second winding 24.

In addition, the controller 50 may generate control signals 65, 67 to each power conversion section 12 in a manner to cancel at least a portion of the alternating component of the flux. The disclosed power converter 10 utilizes a single current sensor 40 and a single controller 50 to generate each of the control signals 65, 67. Because the evenly divides between the branches the amplitude of the current detected by the current sensor 40 may either be divided by the number of branches, when the current sensor is measuring the total input current, to obtain an amplitude of current in a branch, or the amplitude of the current detected by the sensor may be multiplied by the number of branches, when the current sensor is measuring a branch current, to obtain an amplitude of the total input current. Regardless of the location of the current sensor 40, the controller 50 receives the current feedback signal and generates control signals 65, 67 to control operation of both power conversion sections 12.

The controller generates the control signals 65, 67 at a periodic interval (e.g., at a switching period) and transmits the control signals 65, 67 to each of the power conversion sections 12. Because a single controller is used to control each pair of power conversion sections 12, the controller 50 may shift the time within the switching period at which the control signals 65, 67 are sent to each power conversion section 12. If, for example, the power converter 10 includes two power conversion sections 12, the controller 50 may transmit the control signals 65, 67 for one power converter at the start of the switching period and may transmit the control signals 65, 67 for the other power converter at the midpoint of the switching period. Similarly, if the power converter 10 includes four power conversion sections 12, the controller 50 may transmit control signals for one of the power conversion sections at the start of the switching period and for each of the other power conversion sections spaced apart at times equal to one-quarter of the switching period.

Shifting the time at which each control signal, or set of control signals, is sent to a power conversion section 12 may reduce the magnitude of the alternating component of the flux induced in the core 25 of the magnetic device 20. Controlling the switching elements within each power conversion section 12 to alternately turn on and off generates transient voltages and currents which produce a ripple current at the input to the power conversion section 12. If both power conversion sections 12 are commanded to switch at the same time, the resulting ripple current at the input would be added together due to the cumulative effect of both power conversion sections switching in tandem. However, shifting the switching time of one power converter to the middle of the switching period offsets the time at which the switching elements within each power conversion section are activated and, therefore, offsets the time at which the transient voltages and currents are generated. As a result, the phase of the ripple current between power conversion sections 12 is offset. When two power conversion sections are utilized, the phase of the ripple current may be offset by one hundred eighty degrees, allowing the alternating components of the flux resulting from the ripple current similarly be one hundred eighty degrees offset, which, in turn, causes the alternating components of the flux to cancel each other rather than to have a compounding effect.

When assembling the mutual choke 20, the windings 22, 24 are arranged on the core 25 such that there is a poor mutual coupling coefficient between the windings. The core 25 includes an air gap 30 to reduce the coupling and prevent saturation of the core 25 due to the DC component. In one embodiment of the invention, the coupling coefficient between the two windings is between about 0.9 and 1.0. Preferably, the coupling coefficient between the two windings is about 0.95. The poor mutual coupling reduces the risk of saturation in the core, which further assists in reducing the size of the core 25.

The architecture of the disclosed power converter 10 allows for a reduced size for the power converter. The construction of the mutual choke 20 and the control of the power converter sections 12 reduces mutual inductance, leads to DC magnetic component cancellation, and spreads out current ripple over a switching period thereby reducing the required current rating for the inductor. The reduced current rating allows for the physical construction (e.g., conductor sizing and core sizing) to be smaller and results in a consequent physical reduction in size of the core 25 with respect to a traditional magnetic component design. In addition, utilization of a single current sensor 40 and single controller 50 reduce component count and complexity of the power converter 10.

For further illustration, an exemplary embodiment of the invention will be discussed. The example is not intended to be limiting but demonstrates the benefits of the present invention. An exemplary power converter is configured to convert a 150 VDC input voltage to a 500 VDC output. The maximum input for the power converter is 500 amps, and a maximum desired current ripple is 100 amps. The power conversion sections operate at a 20 kHz switching frequency, and a target inductance for an input inductor is 50 microhenries.

As discussed above, traditional power converters require either a single power conversion section and a single inductor at the input of the power converter or, alternately, require paralleled power conversion sections with separate inductors for each power conversion section. In the first instance, a single power conversion section, having a 500 amp rating, with a single inductor would require an inductor weighing about 69 kilograms. In the second instance, a pair of power converters, each having a 250 amp rating and each having a separate inductor, would require two inductors weighing about 19 kilograms each. The combined weight of the inductors for the second instance is about 38 kilograms.

In contrast, the present invention utilizing a single mutual choke 20, as shown in FIG. 1, requires a choke weighing about 6 kilograms, where each winding on the choke is rated at 250 amps. An alternate embodiment, shown in FIG. 4, results in a choke weighing about 8 kilograms, where each winding on the choke is rated at 125 amps. It is further noted that each power conversion section 12 may be rated according to the total rating divided by the number of branches in the power converter 10. Thus, the power conversion sections 12 for FIG. 1 would be rated at 250 amps and the power conversions sections in FIG. 4 would be rated at 125 amps, consistent with the rating of the corresponding windings in the choke 20. As may be observed, the present invention results in a reduction of the required weight in the choke between about fifty to ninety percent from the traditional choke, resulting in a corresponding reduction in the size of the choke.

In addition, the traditional power converter requires a separate controller for each power conversion section. In the example presented above, using paralleled converters with a traditional power converter to achieve at least some reduction in the magnetic component results in two separate controllers and separate current sensors for each controller to regulate the current in each branch. Each controller requires space in a control cabinet and coordination of the two controllers adds complexity in the power converter. Further, the additional controller and additional current sensors add expense to the power converter.

In contrast, the present invention utilizes a single current sensor 40 and a single controller 50 to generate control signals for each of the power conversion sections 12. Thus, the utilization of paralleled power conversion sections 12, allowing for smaller magnetic components, may be implemented with a single sensor 40 and a single controller 50.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A power converter, comprising:
   a plurality of power conversion sections, wherein each power conversion section includes an input operative to receive a first AC voltage having a first magnitude and a first frequency and an output operative to deliver a second DC voltage having a second magnitude and a second frequency;
   a mutual choke, including:
   a magnetic core;
   a first winding on the magnetic core connected in series between a power source and a first power conversion section, selected from the plurality of power conversion sections, the first winding operative to conduct a first current; and
   a second winding on the magnetic core connected in series between the power source and a second power conversion section, selected from the plurality of power conversion sections, the second winding operative to conduct a second current, wherein the first and second windings are connected between the power source and the first and second power conversion sections, respectively, such that the first current flows in an opposite direction than the second current with respect to the magnetic core;
   a current sensor operative to generate a signal corresponding to an amplitude of current entering the power conversion section; and
   a controller operative to receive the signal from the current sensor and to generate a first set of control signals for the first power conversion section and a second set of control signals for the second power conversion section responsive to the signal from the current sensor,
   wherein the mutual choke is a first mutual choke, the power converter further comprising:
   a second mutual choke, including:
   a second magnetic core;

a third winding on the second magnetic core connected in series between the power source and a third power conversion section, selected from the plurality of power conversion sections, the third winding operative to conduct a third current; and a fourth winding on the second magnetic core connected in series between the power source and a fourth power conversion section, selected from the plurality of power conversion sections, the fourth winding operative to conduct a fourth current, wherein the third and fourth windings are connected between the power source and the third and fourth power conversion sections, respectively, such that the third current flows in an opposite direction than the fourth current with respect to the second magnetic core.

2. The power converter of claim 1 further comprising a third mutual choke, including:

a third magnetic core;

a fifth winding on the third magnetic core connected in series between the power source and the first mutual choke, the fifth winding operative to conduct a fifth current; and a sixth winding on the third magnetic core connected in series between the power source and the second mutual choke, the sixth winding operative to conduct a sixth current, wherein the fifth and sixth windings are connected between the power source and the first and second mutual chokes, respectively, such that the fifth current flows in an opposite direction than the sixth current with respect to the third magnetic core.

3. A modular power converter comprising:

at least one pair of power conversion sections, wherein each pair of power conversion sections is operative to receive a first AC voltage having a first magnitude and a first frequency and an output operative to deliver a second DC voltage having a second magnitude and a second frequency;

at least one choke, wherein each choke includes at least one pair of windings connected in a differential mode, and wherein each pair of windings is configured to be connected between a power source operative to provide the first voltage and one pair of the power conversion sections;

a current sensor operative to generate a signal corresponding to an amplitude of current provided to the modular power converter; and a controller operative to receive the signal from the current sensor and to generate a set of control signals for each pair of power conversion sections responsive to the signal from the current sensor, wherein:

the modular power converter includes two pairs of power conversion sections and two chokes, and the modular power converter further includes an additional choke having a pair of windings connected in a differential mode, wherein the pair of windings is configured to be connected between the power source and each of the two chokes.

* * * * *